(12) United States Patent
Boulia

(10) Patent No.: US 9,042,572 B2
(45) Date of Patent: May 26, 2015

(54) MODULAR AUTOMOTIVE MULTIMEDIA AND TELEMATIC EXTENSION BOX AND HEAD UNIT

(75) Inventor: Matthew J. Boulia, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 412 days.

(21) Appl. No.: 13/344,194

(22) Filed: Jan. 5, 2012

(65) Prior Publication Data
US 2012/0114135 A1 May 10, 2012

Related U.S. Application Data

(63) Continuation of application No. 12/276,193, filed on Nov. 21, 2008, now Pat. No. 8,094,832.

(51) Int. Cl.
| | | |
|---|---|---|
| *H04B 1/00* | (2006.01) | |
| *G09F 27/00* | (2006.01) | |
| *H04B 1/08* | (2006.01) | |

(52) U.S. Cl.
CPC .............. *H04B 1/3816* (2013.01); *H04B 1/082* (2013.01)

(58) Field of Classification Search
USPC ............. 381/86, 124, 8; 455/569.2, 345, 346, 455/575.9; 701/400, 419, 431, 536
See application file for complete search history.

(56) References Cited

U.S. PATENT DOCUMENTS

| | | |
|---|---|---|
| 4,513,405 A | 4/1985 | Hills |
| 5,127,057 A | 6/1992 | Chapman |
| 5,339,362 A | 8/1994 | Harris |
| 5,572,442 A | 11/1996 | Schulhof et al. |
| 6,055,478 A | 4/2000 | Heron |
| 6,130,727 A | 10/2000 | Toyozumi |
| 6,147,938 A | 11/2000 | Ogawa et al. |
| 6,608,399 B2 | 8/2003 | McConnell et al. |
| 6,675,232 B1 | 1/2004 | Sato et al. |
| 6,721,236 B1 | 4/2004 | Eschke et al. |
| 6,772,212 B1 | 8/2004 | Lau et al. |
| 6,984,784 B2 | 1/2006 | Nagasaka et al. |
| 6,990,208 B1 | 1/2006 | Lau et al. |
| 7,089,546 B2 | 8/2006 | Watanabe et al. |
| 7,215,784 B1 | 5/2007 | Pham et al. |
| 7,324,833 B2 | 1/2008 | White et al. |
| 7,346,435 B2 | 3/2008 | Amendola et al. |
| 7,634,228 B2 | 12/2009 | White et al. |
| RE41,076 E * | 1/2010 | Chu ................................. 726/34 |
| 7,668,576 B2 * | 2/2010 | Ellenbogen et al. ........ 455/575.1 |
| 7,778,595 B2 | 8/2010 | White et al. |
| 7,987,487 B2 * | 7/2011 | Rackin et al. .................... 725/75 |
| 8,065,026 B2 * | 11/2011 | Beckert et al. ................... 700/94 |

(Continued)

FOREIGN PATENT DOCUMENTS

| | | |
|---|---|---|
| AU | 2002100304 | 6/2002 |
| JP | 11-317063 | 11/1999 |
| JP | 2000333271 | 11/2000 |

*Primary Examiner* — Vivian Chin
*Assistant Examiner* — David Ton
(74) *Attorney, Agent, or Firm* — Snell & Wilmer LLP

(57) ABSTRACT

The present invention relates to a modular automotive multimedia and telematic extension unit and head unit. In one embodiment, the present invention is an extension unit including a storage unit storing an application of an external personal electronic device, a processor connected to the storage unit, and a first connection unit connected to the storage unit and configured to be connected to a head unit in an automobile.

18 Claims, 3 Drawing Sheets

(56) References Cited

U.S. PATENT DOCUMENTS

| | | |
|---|---|---|
| 8,311,584 B2 * | 11/2012 | Douthitt et al. .............. 455/563 |
| 2004/0165734 A1 | 8/2004 | Li |
| 2005/0044574 A1 | 2/2005 | Lau et al. |
| 2005/0281414 A1 * | 12/2005 | Simon et al. .................... 381/86 |
| 2006/0004788 A1 * | 1/2006 | Pilgrim et al. ................ 707/100 |
| 2007/0015486 A1 * | 1/2007 | Marlowe ....................... 455/345 |
| 2007/0178830 A1 * | 8/2007 | Janik et al. ................... 455/3.06 |
| 2007/0293183 A1 | 12/2007 | Marlowe |
| 2008/0127160 A1 | 5/2008 | Rackin et al. |
| 2008/0130912 A1 | 6/2008 | Marlowe |

\* cited by examiner

MODULAR AUTOMOTIVE MULTIMEDIA AND TELEMATIC EXTENSION BOX AND HEAD UNIT

CROSS REFERENCE TO RELATED APPLICATIONS

This application is a continuation application of U.S. patent application Ser. No. 12/276,193, filed on Nov. 21, 2008, the entire contents of which is incorporated herein by reference.

BACKGROUND

1. Field

The present invention relates to a modular automotive multimedia and telematic extension box and head unit.

2. Background

A user may want to connect a portable electronic device to an automobile's infotainment system. To do so, the automobile must be pre-configured to accept the device either through a hardwired interface or a pre-defined wireless interface and a corresponding pre-defined software interface. A user may also want to add new applications, revisions to improve existing applications, or add new communication protocols for new devices to the vehicle's infotainment system after the vehicle has been built. Once the automobile is built, the factory-installed infotainment system has traditionally been difficult to update without full replacement of the head unit. An automotive dealer may want the flexibility to add this capability onto the car at the point of sale inexpensively and quickly, with minimum tear-up of the vehicle. The user may want this ability as well while maintaining the vehicle's interior styling.

Thus, there is a need for a modular automotive multimedia and telematic extension box and mating head unit to allow the dealer to add value to the vehicle at the point of sale, and allow both the dealer and user to continue to maintain vehicle value and styling through upgradeability for new devices, applications, communication profiles, and software updates.

SUMMARY

In one embodiment, the present invention is an extension unit including a central processing unit, a storage unit which may include an internal flash memory, a hard drive, a SD Card slot, and/or a combination thereof, for storing an operating system and applications which allow the extension to communicate with external portable personal electronic devices through various communication connections which may include wired serial communication, wireless communication via Bluetooth, WiFi, or WiMAX, and a first connection unit connected to the extension unit and configured to be connected to a head unit in an automobile.

In another embodiment, the present invention is a head unit including a central processing unit, storage unit, and/or various multimedia playback devices for an automobile including a body having a receptacle for the above described extension unit, and a display connected to the body which tilts open to expose the receptacle for the extension unit, the first connection unit transmitting data from the extension unit to the display when the first connection unit is connected to the display.

In yet another embodiment, the present invention is an automobile including a head unit including a central processing unit, storage unit, and/or various multimedia playback devices for an automobile including a body having a receptacle for the above described extension unit, and a display connected to the body which tilts open to expose the receptacle for the extension unit, and an extension unit including a central processing unit, a storage unit connected to the central processing unit including an internal flash memory, a hard drive, a SD Card slot, and/or a combination thereof, for storing an operating system and applications which allow the extension to communicate with external portable personal electronic devices through various communication connections such as wired serial communication, wireless communication via Bluetooth, WiFi, or WiMAX, the extension unit also storing an application of an external portable personal electronic device, the application simulating the external portable personal electronic device and allowing a user to access features of the external portable personal electronic device even when the external portable personal electronic device is disconnected from the extension unit. The extension unit can also include a first connection unit connected to the storage unit and configured to be connected to the display, the first connection unit transmitting data from the application to the display when the first connection unit is connected to the display. A second connection unit can optionally be included and configured to be connected to the external portable personal electronic device.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
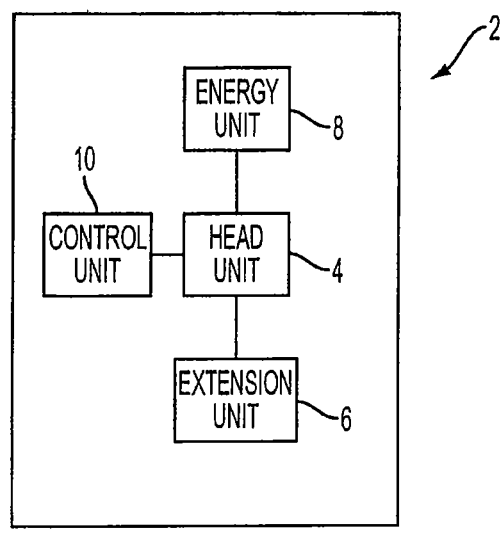
FIG. 1 is a block diagram of a modular system for an automobile according to an embodiment of the present invention.

FIG. 1 is a block diagram of a modular system 2 for a vehicle according to an embodiment of the present invention. As seen in FIG. 1, modular system 2 includes a head unit 4, an extension unit 6, an energy unit 8, and a control unit 10. The vehicle can be an automobile, an airplane, a boat or any type of device suitable to transport people. Energy unit 8 is connected to head unit 4. Energy unit 8 can be any type of energy source such as a battery or an engine. Control unit 10 is connected to head unit 4. In one embodiment, control unit 10 is an engine control unit. Although not shown, control unit 10 can be optionally connected to energy unit 8 and/or extension unit 6. Control unit 10 can optionally monitor or direct the functions of head unit 4.

Figure 2:
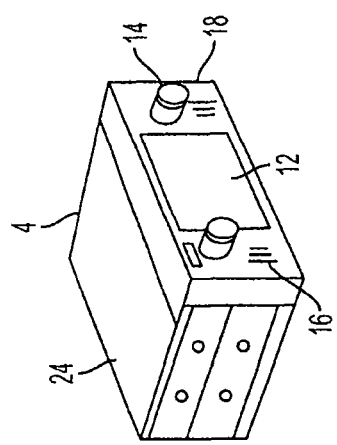
FIG. 2 is a perspective view of a head unit of the modular system where faceplate is in a first position according to an embodiment of the present invention.

FIG. 2 is a perspective view of head unit 4 of modular system 2 where faceplate 18 is in a first position according to an embodiment of the present invention. Head unit 4 includes a body 24, a faceplate 18, a display 12, buttons 14 (if necessary), and a microphone 16 (microphone 16 may be external to head unit 4 depending on vehicle configuration). In one embodiment, body 24 is formed from sheet metal. Faceplate 18 is connected to body 24 and includes display 12, buttons 14, and microphone 16. Display 12 displays data such as text or visual images for head unit 4. Buttons 14 allow a user to interact with head unit 4 while microphone 16 allows a user to vocally interact with head unit 4. Faceplate 18 is movable and can be moved from a first position to a second position even when it is connected to body 24. In one embodiment, faceplate 18 is moved through manual springs and/or dampers (not shown). In another embodiment, faceplate 18 is moved through the use of an electrical motor and tilt mechanism (not shown). As shown in FIG. 2, faceplate 18 is in a first position.

Figure 3:
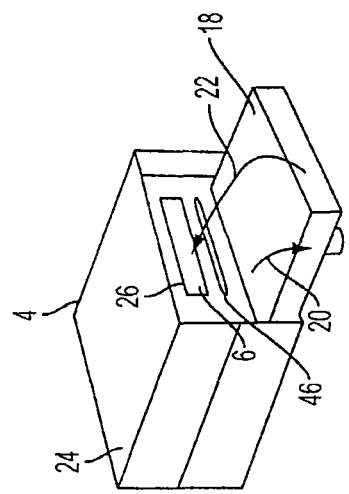
FIG. 3 is a perspective view of head unit of modular system where faceplate is in a second position according to an embodiment of the present invention.
Figure 4:
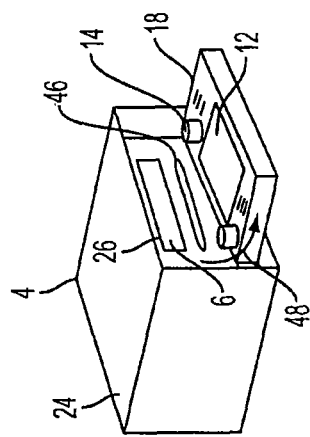
FIG. 4 is a perspective view of head unit of modular system where faceplate is in a second position according to an embodiment of the present invention.

FIG. 3 is a perspective view of head unit 4 of modular system 2 where faceplate 18 is in a second position according to an embodiment of the present invention. Faceplate 18 is moved to a second position as indicated by arrow 20. In one embodiment, when faceplate 18 is moved to the second position, display 12 faces a downwards direction. In another embodiment as depicted in FIG. 4, which is a perspective view of head unit 4 of modular system 2 where faceplate 18 is moved to a second position as indicated by arrow 48. As shown in FIG. 4, when faceplate 18 is moved to the second position, display 12 faces an upwards direction.

Referring again to FIG. 3, when faceplate 18 is moved to the second position, receptacle 26 and disc player 46 in body 24 are exposed. Disc player 46 can read and play discs such as a compact disc or DVD. Furthermore, extension unit 6 can be stored in head unit 4 by placing extension unit 6 in receptacle 26 as indicated by arrow 22. In one embodiment, extension unit 6 can be secured in and/or released from receptacle 26 and body 24 through manual springs and/or dampers (not shown).

Figure 5:
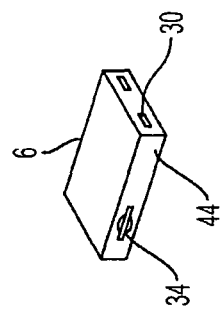
FIG. 5 is a perspective view of extension unit according to an embodiment of the present invention.

FIG. 5 is a perspective view of extension unit 6 according to an embodiment of the present invention. As shown in FIG. 5, extension unit 6 includes a body 44. Visible on an exterior of body 44 is an SD card connection 34 and a serial communication connection unit 30.

Figure 6:
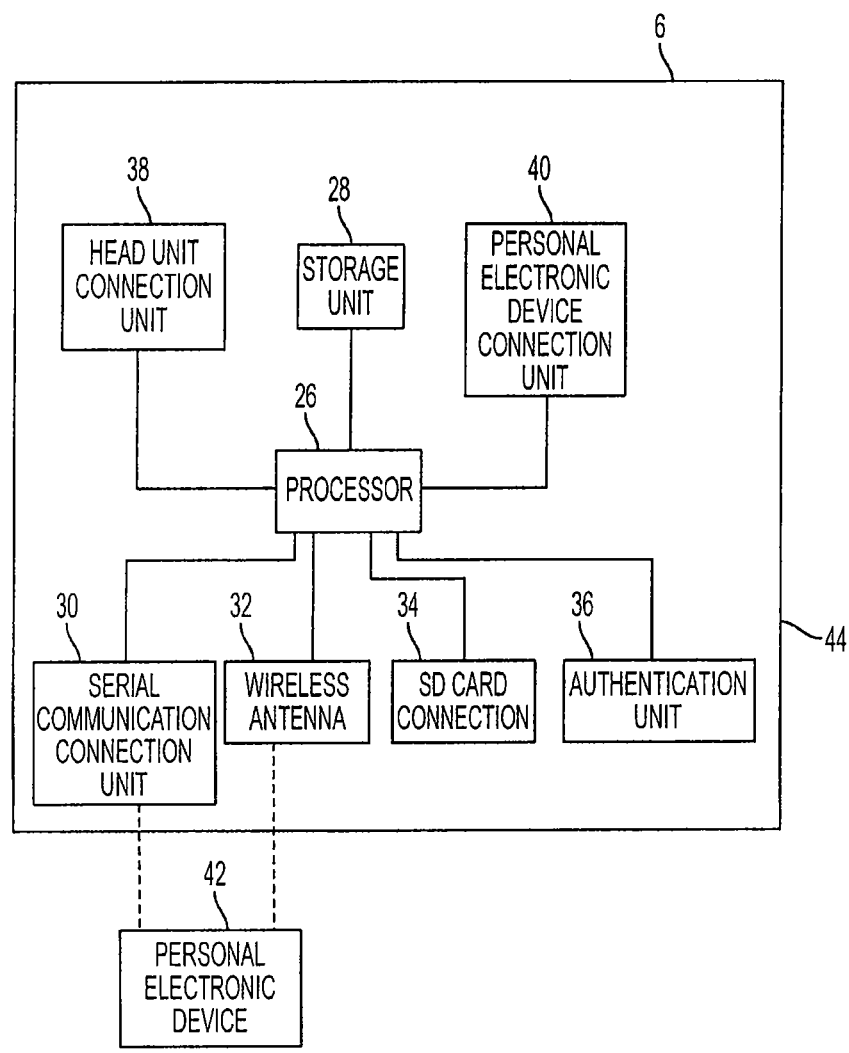
FIG. 6 is a block diagram of extension unit according to an embodiment of the present invention.

FIG. 6 is a block diagram of extension unit 6 according to an embodiment of the present invention. As seen in FIG. 6, extension unit 6 includes body 44 which holds storage unit 28, head unit connection unit 38, processor 26, serial communication connection unit 30, wireless antenna 32, and SD Card connection 34. Optionally, an authentication unit 36 and/or personal electronic device connection unit 40 can be included.

Head unit connection unit 38 is connected to processor 26 and also head unit 4. Head unit connection unit 38 facilitates the transmission of data between head unit 4 and extension unit 6. Head unit connection unit 38 can be, for example, metal prongs, cable slots, wireless transmission and reception device, or any other type of device permitting communication between head unit 4 and extension unit 6.

Optional personal electronic device connection unit 40 is connected to processor 26. Personal electronic device connection unit 40 can be configured to be connected with external personal electronic device 42 and can facilitate the transmission of data between extension unit 6 and external personal electronic device 42. Personal electronic device connection unit 40 can be, for example, metal prongs, cable slots, wireless transmission and reception device, or any other type of device permitting communication between extension unit 6 and external personal electronic device 42.

External personal electronic device 42 can be connected and disconnected from extension unit 6. External personal electronic device 42 can be connected to extension unit 6 through serial communication connection unit 30 and wireless antenna 32. Although not shown in FIG. 6, external personal electronic device 42 can also optionally be connected to extension unit 6 through SD card connection 34 and/or personal electronic device connection unit 40. External personal electronic device 42 contains an application that is used when a user utilizes external personal electronic device 42. External personal electronic device 42 can be, for example, an audio device, a video device, an audio/video device, mobile phones, personal digital assistants, game systems, etc. Furthermore, it is contemplated that external personal electronic device 42 can be a stationary device or a portable device.

Storage unit 28 is connected to processor 26 and stores an operating system which is used to run extension unit 6. The operating system can be a Microsoft Windows® based operating system, a UNIX based operating system, a Linux based operating system, or any other type of operating system. Storage unit 28 can also store a copy of the application of external personal electronic device 42. Furthermore, storage unit 28 can also store multimedia files such as mp3's, wave files, audio files, mpeg files, video files, or any other types of multimedia files. Storage unit 28 can be, for example, a hard disk drive, a solid-state drive, or other types of storage mediums.

Serial communication connection unit 30 is connected to processor 26 and allows extension unit 6 to communicate with an external device. Serial communication connection unit 30 can be, for example, a universal serial bus ("USB") connection unit using the USB standard and any version of the USB standard. In one embodiment, serial communication connection unit 30 can be adapted to be used for USB 1.1 devices. In another embodiment, serial communication connection unit 30 can be adapted to be used with USB 1.1 or USB 2.0 devices. The external device can be any type of electronic equipment such as a computer, a mobile phone, a personal digital assistant, etc.

Wireless antenna 32 is connected to processor 26 and allows extension unit 6 to communicate with an external device wirelessly. Wireless antenna 32 can be an RF antenna, cellular antenna, a Bluetooth antenna, or even a GPS antenna. If wireless antenna is a global positioning system ("GPS") antenna, it is contemplated that extension unit 6 can have GPS capabilities. Again, the external device can be any type of electronic equipment.

Secure digital ("SD") card connection 34 is connected to processor 26 and allows extension unit 6 to read data from an SD card. In one embodiment, SD card connection 34 can read data from both SD and SD high capacity cards.

Optional authentication unit 36 is connected to processor 26 and allows extension unit 6 to be authenticated to head unit 4 and/or for head unit 4 to be authenticated to extension unit 6 when extension unit 6 is connected to head unit 4. Authentication unit 6 can also be used to authenticate head unit 4 to an external device and receive authentication from the external device. Thus, authentication unit 36 can allow one-way or mutual authentication. Authentication unit 36 can also allow a user to be authenticated to ensure that the user is authorized to use extension unit 6. This can be done, for example, by requiring the user to enter a password to extension unit 6, head unit 4, or the external device, such that it can be verified by extension unit 6. Authentication can also be done, for example, through the use of biometrics such as voice, fingerprints, or other biological data of the user. Authentication unit 6 can also communicate with other external devices through serial communication connection unit 30, optional personal electronic device connection unit 40, and/or head unit connection unit 38.

Authentication unit 36 can thus ensure that extension unit 6 is plugged into an appropriate head unit 6 and also that an authorized user is using extension unit 6. This can be advantageous, for example, to discourage thefts of extension unit 6. Furthermore, this can be advantageous if extension unit 6 is part of a subscription plan in which certain features of extension unit 6 are available on a subscription or additional purchase basis.

Processor 26 is connected to head unit connection unit 38, storage unit 28, personal electronic device connection unit 40, serial communication connection unit 30, wireless antenna 32, SD card connection 34, and authentication unit 36. Processor 26 executes the operating system stored in storage unit 28 and can be, for example, a central processing unit. Processor 26 can also execute the copy of the application of external personal electronic device 42. By executing the copy of the application of external personal electronic device 42, processor 26 can simulate external personal electronic device 42. Through simulating external personal electronic device 42, extension unit 6 can reduce the necessity for external personal electronic device 42 to be connected to extension unit 6 in order for a user to utilize some or all of the features of external personal electronic device 42. Thus, the user can access features of external personal electronic device 42 even when external personal electronic device 42 is disconnected from extension unit 6. This is advantageous as it reduces the amount of equipment that must be connected in order for a user to utilize features of external personal electronic device 42. Furthermore, it may be cumbersome for the user to constantly connect and disconnect external personal electronic device 42, especially when the user may want to use external personal electronic device 42 in another automobile or at a separate location.

In addition, in the world of electronics, new models of external personal electronic device 42 may be introduced. Since the new models of external personal electronic device 42 may have modified sizes different from the earlier version of external personal electronic device 42, it may be difficult to connect external personal electronic device 42 to extension unit 6. For example, automobile 2, extension unit 6, and/or head unit 4 may have had a receptacle specifically sized for external personal electronic device 42 allowing external personal electronic device 42 to be connected to extension unit 6. However, if a new version of external personal electronic device 42 has a different size and/or shape, then the new version of external personal electronic device 42 may not fit the receptacle thus preventing external personal electronic device 42 from being connected to extension unit 6 or forcing external personal electronic device 42 to be placed in a different location. This can hamper the usability of external personal electronic device 42 and even make its use prohibitive.

However, with the features of the present invention, a new version of external personal electronic device 42 can be used even when the sizing and/or shape of external personal electronic device 42 is modified since processor 42 can simulate the functions and/or features of external personal electronic device 42 using the copy of the application of external personal electronic device 42. Furthermore, the user will also not have to constantly connect and disconnect external personal electronic device 42 if the user wants to use external personal electronic device 42 outside of the vehicle.

In operation, the user moves faceplate 18 from the first position to the second position and extracts extension unit 6 from receptacle 26 in head unit 4. Optionally, the user can move faceplate 18 back to the first position while extension unit 6 is removed from head unit 4. The user then downloads the copy of the application of external personal electronic device 42 to extension unit 6. This can be done, for example, by connecting extension unit 6 to external personal electronic device 42 using personal electronic device connection unit 40 or by connecting extension unit 6 to an external device containing the copy of the application of external personal electronic device 42 through serial communication connection unit 30, wireless antenna 32, and/or SD card connection 34. Authentication unit 36 can authenticate either in one-way or a mutual manner to ensure that extension unit 6 should be allowed to download the application of external personal electronic device 42. External personal electronic device 42 and/or the external device can be disconnected from extension unit 6.

The user then moves faceplate 18 from the first position to the second position if faceplate 18 is in the first position. Extension unit 6 is then inserted into receptacle 26 and secured to head unit 4. Faceplate 18 is then moved from the second position to the first position. Optionally, the user may be required to be authenticated such as through authentication unit 36 in extension unit 6. Then, the user may interact with the application of external personal electronic device 42 which simulate features of external personal electronic device 42. The simulated features of external personal electronic device 42 are displayed on display 12 and such interactions can be visually through display 12, audibly through microphone 16 and/or speakers (not shown), and/or physically through buttons 14.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An extension unit configured to be removed from or inserted into a receptacle of a head unit of an automobile, the extension unit comprising:

a storage unit for storing an operating system and for storing a copy of a software application of a portable electronic accessory;

a processor connected to the storage unit and configured to modify the copy of the software application of the portable electronic accessory such that the modified copy of the software application is compatible with the operating system, and execute the modified copy of the software application using the operating system; and a first connection unit connected to the storage unit and configured to be connected to the head unit of the automobile by inserting into the receptacle, wherein the execution of the modified copy of the software application simulates the portable electronic accessory and allows a user to access features of the portable electronic accessory even when the portable electronic accessory is disconnected from the extension unit.

2. The extension unit of claim 1 further comprising a second connection unit configured to be connected to the portable electronic accessory.

3. The extension unit of claim 1 wherein the portable electronic accessory is an audio unit, a video device, an audio and video device, a mobile phone or a navigation unit.

4. The extension unit of claim 1 wherein the portable electronic accessory is a navigation unit.

5. The extension unit of claim 1 further comprising a USB connection connected to the processor.

6. The extension unit of claim 1 further comprising a wireless antenna connected to the processor.

7. The extension unit of claim 1 further comprising an SD card connection connected to the processor.

8. The extension unit of claim 1 further comprising an authentication unit connected to the processor.

9. An extension unit configured to be removed from or inserted into a receptacle of a head unit of an automobile, the extension unit comprising:
    a storage unit for storing a copy of a media file of a portable electronic accessory and a copy of a software application of the portable electronic accessory;
    a processor connected to the storage unit and configured to process the copy of the media file to play the copy of the media file for outputting an audio or a video for a user of the automobile and allow the user of the automobile to access the copy of the media file even when the portable electronic accessory is disconnected from the extension unit, and
    a first connection unit connected to the storage unit and configured to be connected to the head unit of the automobile by inserting into the receptacle, the first connection unit transmitting data corresponding to the processed copy of the media file or the executed or operated copy of the software application to the head unit when the first connection unit is connected to the head unit.

10. The extension unit of claim 9 wherein the head unit includes a microphone, and the executed or operated copy of the software application allows the user to vocally interact with the head unit to access features of the head unit and the simulated function or feature of the portable electronic accessory.

11. The extension unit of claim 9 further comprising a second connection unit configured to be connected to the portable electronic accessory.

12. The extension unit of claim 9 wherein the portable electronic accessory is an audio unit, a video unit, an audio and video unit, a mobile phone or a navigation unit.

13. The extension unit of claim 9 further comprising:
    a USB connection connected to the processor;
    a wireless antenna connected to the processor;
    an SD card connection connected to the processor; and
    an authentication unit connected to the processor.

14. The extension unit of claim 9 wherein the head unit has a body with a front portion that is configured to be movable between an open position and a closed portion, wherein when the front portion is in the closed position, the front portion covers the receptacle for preventing the extension unit from being removed from or inserted into the receptacle and when the front portion is in the open position, the head unit exposes the receptacle for allowing the extension unit to be removed from or slidably inserted into the receptacle.

15. An automobile comprising:
    a head unit including a body having a front portion, a receptacle, and a display, the front portion configured to be movable between a closed position and an position, wherein when the front portion is in the closed position, the front portion covers the receptacle, and when the front portion, is in the open position, the receptacle is uncovered; and
    an extension unit configured to be slidably inserted in the receptacle when the front portion of the body of the head unit is in the open position, the extension unit including:
        a storage unit storing a copy of a software application of a portable electronic accessory,
        a processor connected to the storage unit and configured to execute the copy of the software application, the executed copy of the software application simulating a function or a feature of the portable electronic accessory to allow the user to access the simulated function of the feature of the portable electronic accessory even when the portable electronic accessory is disconnected from the extension unit, and
        a first connection unit connected to the storage unit and configured to be connected to the head unit, the first connection unit transmitting data corresponding to the executed copy of the software application to the head unit when the first connection unit is connected to the head unit.

16. The automobile of claim 15 wherein the portable electronic accessory is an audio unit or a navigation unit.

17. The extension unit of claim 15, wherein the front portion of the body of the head unit is configured to be in a vertical position when in the closed position, and further configured to tilt to a horizontal position when in the open position to uncover the receptacle.

18. The extension unit of claim 15 wherein the extension unit is configured to establish an electronic connection with the head unit after the extension unit is slidably inserted in the receptacle without requiring additional wired connections, for allowing the extension unit to be easily removed from or inserted into the receptacle of the head unit.

* * * * *